United States Patent [19]
Fisher et al.

[11] Patent Number: 6,084,330
[45] Date of Patent: Jul. 4, 2000

[54] PERMANENT MAGNET ROTOR AND METHOD OF ASSEMBLY

[75] Inventors: Robert L. Fisher, Christiansburg; Daniel H. Snuffer, Radford, both of Va.

[73] Assignee: Kollmorgen Corporation, Waltham, Mass.

[21] Appl. No.: 09/251,020

[22] Filed: Feb. 16, 1999

Related U.S. Application Data

[60] Provisional application No. 60/077,918, Mar. 13, 1998.

[51] Int. Cl.⁷ ........................................... H02K 5/00
[52] U.S. Cl. .................. 310/91; 310/15; 29/598
[58] Field of Search ............... 310/91, 156, 262; 29/598

[56] References Cited

U.S. PATENT DOCUMENTS

| | | | |
|---|---|---|---|
| 4,219,752 | 8/1980 | Katou | 310/156 |
| 4,742,259 | 5/1988 | Schaefer et al. | 310/156 |
| 4,910,861 | 3/1990 | Dohogne | 29/598 |
| 4,973,872 | 11/1990 | Dohogne | 310/156 |
| 5,040,286 | 8/1991 | Stark | 29/598 |
| 5,144,735 | 9/1992 | Stark | 29/732 |
| 5,175,461 | 12/1992 | Zigler et al. | 310/156 |
| 5,237,737 | 8/1993 | Zigler et al. | 29/598 |
| 5,345,129 | 9/1994 | Molnar | 310/156 |
| 5,345,669 | 9/1994 | Zigler et al. | 29/598 |
| 5,563,463 | 10/1996 | Stark | 310/156 |
| 5,881,447 | 3/1999 | Molnar | 29/598 |
| 5,898,990 | 5/1999 | Henry | 29/598 |

Primary Examiner—Nicholas Ponomarenko
Assistant Examiner—Joseph Waks
Attorney, Agent, or Firm—Morgan & Finnegan, LLP

[57] ABSTRACT

The invention resides in permanent magnet rotors and methods for assembling the same. In one embodiment, one of more arcuate magnetic elements are disposed around a cylindrical rotor core. In turn, a hollow retaining shell is slip-fit around the magnetic element or elements. Spring biasing members are inserted into longitudinal channels defined by grooves in the core and corresponding grooves or chamfers on the one or more magnetic elements. The spring biasing members prevent relative movement between the core, the magnetic element(s), and the retaining shell. Annular end plates are secured to the ends of the core to seal off the interior of the device. In another embodiment, relative movement between the core, magnetic element(s), and retaining shell is prevented by applying adhesive between those parts.

32 Claims, 3 Drawing Sheets

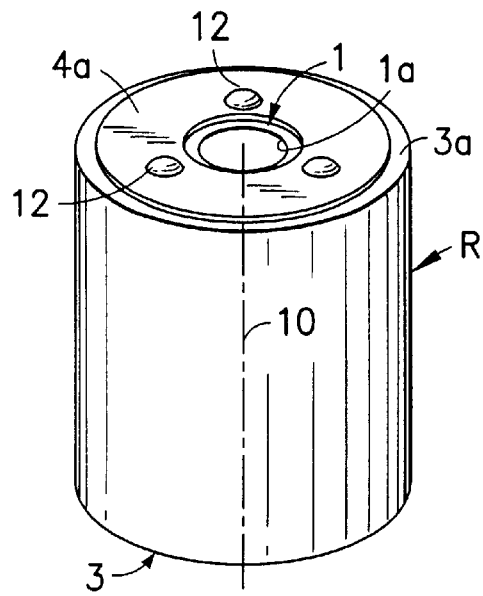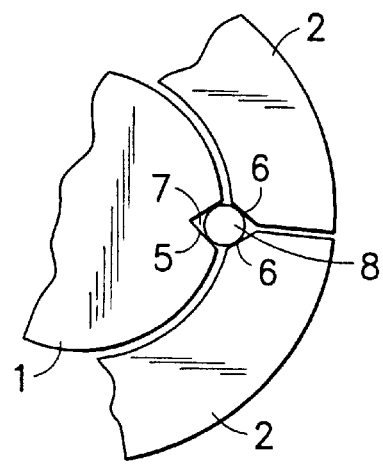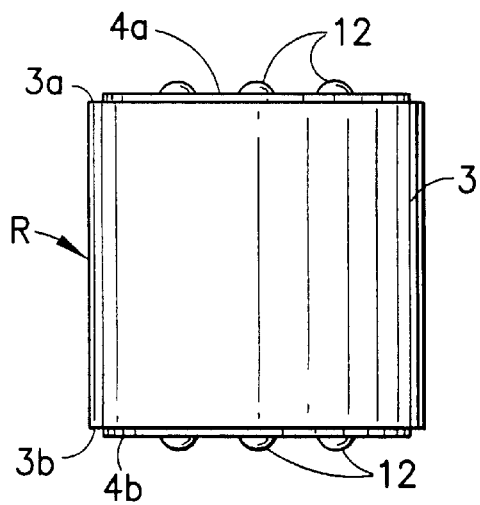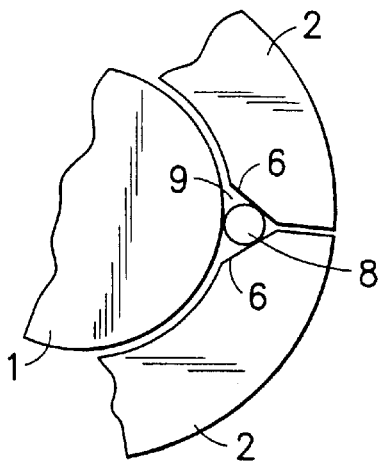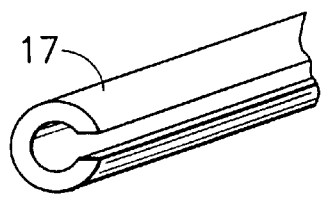

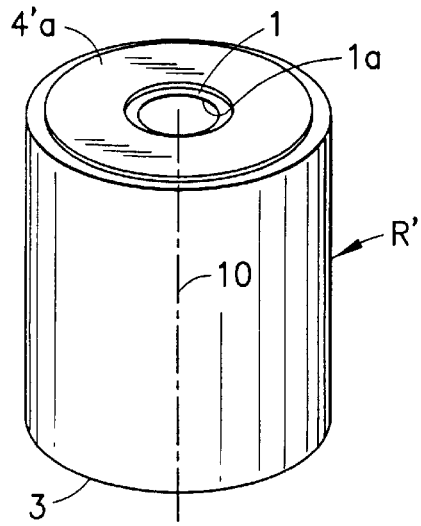
FIG.6
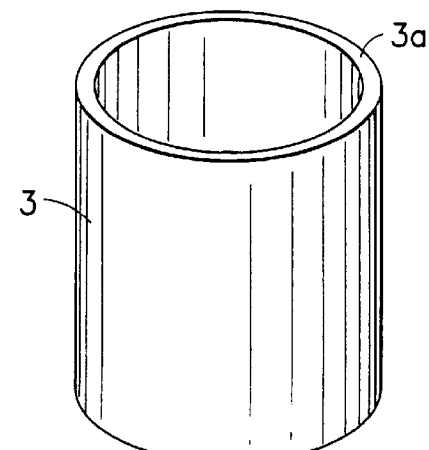
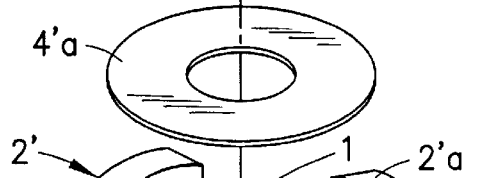
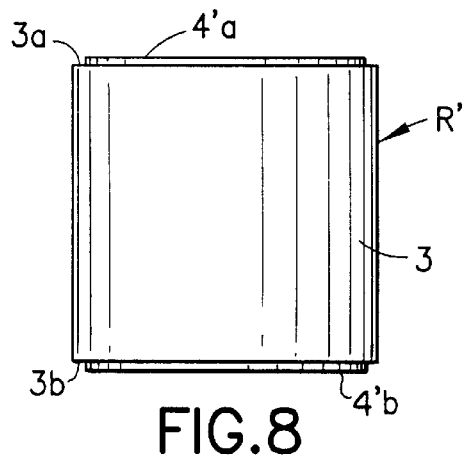
FIG.8
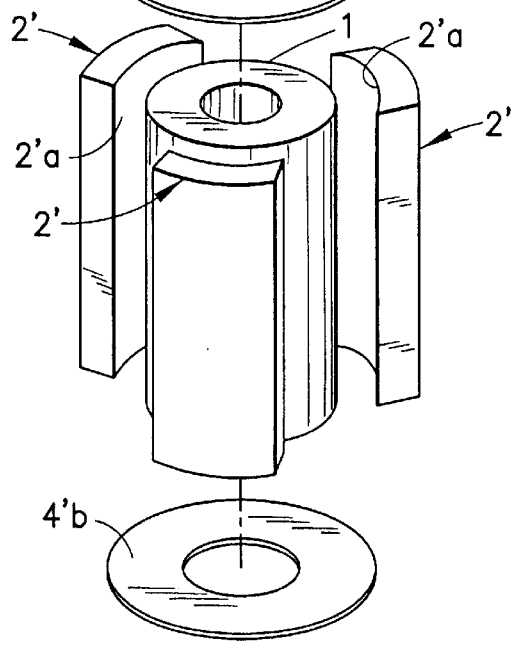
FIG.7

PERMANENT MAGNET ROTOR AND METHOD OF ASSEMBLY

This application claims the benefit of U.S. Provisional No. 60/077,918 filed Mar. 13, 1998.

FIELD OF THE INVENTION

The present invention relates generally to permanent magnet rotors for electric motors, and more specifically to novel rotors having particular application in electronically commutated motors operable at relatively high rotor speeds, and to a novel method for assembly of the rotor and to electric motors provided with said rotors.

BACKGROUND OF THE INVENTION

Permanent magnet rotors for dynamoelectric machines, such as electronically commutated motors, typically are constructed of a generally cylindrical iron core, which may be of a solid, laminated or sintered metal construction, and around which are positioned a plurality of magnetic elements. The magnetic elements typically are arcuate shaped with an inner contour conforming to the outer surface of the core such that the magnets may contact the outer circumferential surface of the core. The magnetic elements generally are made from barium or strontium ferrite, samarium cobalt, neodymium iron boron (rare earth) or other known magnetic materials. Permanent magnet rotors of this general type find particular application in motors having control circuitry which controls energization of the windings in one or more predetermined sequences to provide rotational magnetic fields and thereby rotation of the rotor.

The relative high mass of the materials used to form the magnetic elements and the relatively high rotor speeds create significant forces during rotor operation, including centrifugal forces and substantial momentum forces upon sudden stops or reversals of direction of rotor rotation. Retention of the magnetic elements in predetermined radial positions about the core is therefore necessary for reliable motor operation.

In addition, motors operating in fluid systems are contained in a hermetically sealed unit with the motor exposed to the fluid, such as the coolant in a refrigeration system. Recently, for example, because of increasing demand for higher efficiencies, it has become desirable to use permanent magnet variable speed motors to drive compressors in refrigeration systems. However, because many adhesives contain organic materials which are soluble in, or are leached out by, the refrigerant fluids used in these systems, resulting in matter being introduced into these fluids and condensing or otherwise accumulating in the capillary tubes and thereby causing serious or complete system failure, a motor containing minimum amounts of organic materials is desirable.

Other potential contaminants of the systems in which motors are intended for use are dust attracted by the magnetic elements and particles of the magnetic elements themselves. The magnets attract such particulate matter or, because they generally are somewhat brittle, particles of the magnetic material tend to chip or flake off during handling or use. Because dust and/or magnetic particles also can contaminate many systems in which motors are used, e.g., fluid systems and high technology applications, such as computer disk drives, encasement of the rotor assembly in a manner which eliminates the possibility of these additional potential contaminants also is desirable.

A number of methods and techniques for retaining magnets in fixed relation on the rotor core previously have been considered. One such technique has been to wrap the magnetic elements with a plastic or fiberglass material, or a relatively fine wire, and then covering the wrapping with an adhesive or epoxy resin overcoat. This technique is disadvantageous for its obvious costly labor intensive requirements and also because all of these materials become potential contaminants in any fluid system in which the rotor assembly may be used.

Another technique for retaining magnets about a rotor core involves the use of an open-ended cylindrically-shaped "can" or shell surrounding the magnets. These prior retaining shell structures typically involve deforming or press-fitting the retainer shell over the core/magnet subassembly and/or crimping or rolling the ends of the retainer shell onto the end plates, such as shown in U.S. Pat. Nos. 5,040,286 and 5,563,463, thereby requiring costly additional manufacturing apparatus and operations. Other prior structures, such as shown in U.S. Pat. No. 5,237,737, also disclose the formation of rigid ribs on the outer surface of the core which, in combination with an adhesive and/or deformation of the retainer shell, serve to prevent slippage of the magnets relative to the core. Consequently, these structures also suffer the disadvantages of manufacturing cost previously mentioned and, in addition, are incapable of being completely devoid of adhesive materials which are potential contaminants of many systems in which the rotor may be used.

In sum, while many of the aforementioned approaches to retaining magnets on rotor cores have been found satisfactory for certain intended applications, many exhibit drawbacks such as difficulty in manufacture and/or assembly, resulting in excessive manufacturing costs; failure to adequately retain the magnets in fixed radial position on the rotors during high speed operation and when subjected to repeated starting, stopping and reversal of the motor in which the rotor is used; and an undesirability for use in certain fluid systems and high technology applications, where the materials of construction in the rotor assembly are potential contaminants.

OBJECTS OF THE INVENTION

One of the primary objects of the present invention is to provide a novel permanent magnet rotor assembly in which the magnetic elements are encased in such a manner as to effectively prevent the accumulation of dust and also to retain within the rotor assembly any particles attracted by the magnetic elements, or any particles of magnetic material that may break off the magnetic elements as a result of handling, chipping, flaking or cracking.

Another primary object of the present invention is to provide a novel permanent magnet rotor assembly in which the magnetic elements are encased in such a manner as to eliminate the possibility of organic or other material leaking or leaching from the rotor assembly and thereby becoming the source of a contaminant in any fluid system in which the rotor may be used.

Another primary object of the present invention is to provide a novel permanent magnet rotor assembly which is particularly tolerant of substantial dimensional tolerance variations in the magnetic elements and retaining shell.

Another primary object of the present invention is to provide a novel method for assembling a permanent magnet rotor which provides relatively low cost and ease of manufacture and yet results in optimum magnetic element retention.

Another primary object of the present invention is to provide a permanent magnet rotor assembly having improved means to prevent slippage of the magnets relative to the rotor during high speed operation.

Still another object of the present invention is to provide a rotor structure which is extremely durable and yet relatively easy to manufacture and at relatively low cost.

A further object of the present invention is to provide an electric motor with a permanent magnet rotor constructed and/or assembled in accordance with the foregoing objects.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps and improvements herein shown and described.

SUMMARY OF THE INVENTION

The aforementioned objects of the present invention may be achieved in accordance with one embodiment and method of assembly of a permanent magnet rotor which includes the steps of forming a plurality of discrete grooves in the outer peripheral surface of a cylindrical rotor core member, each of said grooves being parallel to each other and to the longitudinal axis of the core; securing a circular end plate to one end of the rotor core, the end plate having a diameter greater than that of the core member; placing the end plate and core subassembly within a thin-walled hollow cylindrical retaining shell adapted to slip-fit over the outer circumferential edge of the end plate until one end of the shell is flush with the outer face of the end plate; inserting a plurality of arcuate-shaped magnetic elements into the annulus between the core and retaining shell, each of said magnetic elements having a chamfered edge along its longitudinally extending inner radii; aligning the chamfered edges of adjacent magnetic elements with each of said grooves in the core so as to form a plurality of enclosed longitudinally extending channels between the core and magnets; inserting a compressed elongated spring member into each of the aforesaid channels, each spring member extending end-to-end in each of said channels and exerting a radially outwardly-directed spring-biased force against said channel walls to thereby secure the core, magnets and retaining shell together and lock the magnets in a fixed radial position relative to the core; and thereafter securing a second circular end plate to the opposite end of said core, said second end plate also adapted to slip-fit within said retaining shell and be mounted with its outside face flush with the end of the retaining shell to thereby permanently retain the magnetic elements in position around the core.

Use of the assembly method of the present invention facilitates construction of a rotor structure which is highly tolerant of a relatively wide range of dimensional variations in the magnetic elements which surround the core while assuring fixed retention of the magnetic elements relative to the core, both longitudinally and rotationally.

Rotors produced in accordance with the preferred embodiments of the present invention are completely devoid of organic materials and therefore can be used to particular advantage in fluid systems such as, for example, hermetically sealed refrigeration compressor applications, where exposure to refrigeration and/or lubricating fluids is likely to occur, and where relatively high efficiency ratings may be required.

Finally, a rotor assembly in accordance with the present invention fully encases the magnetic elements in nonmagnetic, preferably metallic material, thereby preventing the magnetic elements from attracting dust and also retaining any free particles of magnetic material within the nonmagnetic encasement structure.

Other objects, advantages and features of the present invention will become apparent from the following detailed description of the invention when taken in conjunction with the accompanying drawings wherein like reference numerals designate like elements throughout the several views.

Thus, it will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

BRIEF DESCRIPTION OF THE DRAWINGS

FIG. 1 is a perspective view of a permanent magnet rotor constructed in accordance with a preferred embodiment of the present invention;

FIG. 2A is an enlarged schematic view, partially broken away, illustrating the assembled position of one of the locking spiral pin members shown in FIG. 2;

FIG. 3 is an elevational view of the rotor of FIG. 1;

FIG. 4 is an enlarged schematic view similar to FIG. 2A, illustrating an alternate configuration for locating the locking spiral pin member shown in FIG. 2A;

FIG. 5 is a partial perspective view of an alternate embodiment for the locking pin member of FIG. 2A, the view illustrating a "C"-shaped elongated pin structure;

FIG. 6 is a perspective view of a permanent magnet rotor constructed in accordance with an alternate embodiment of the present invention;

FIG. 7 is an exploded view of the rotor of FIG. 6; and

FIG. 8 is an elevational view of the rotor of FIG. 7.

DESCRIPTION OF THE PREFERRED EMBODIMENTS

Figure 2:
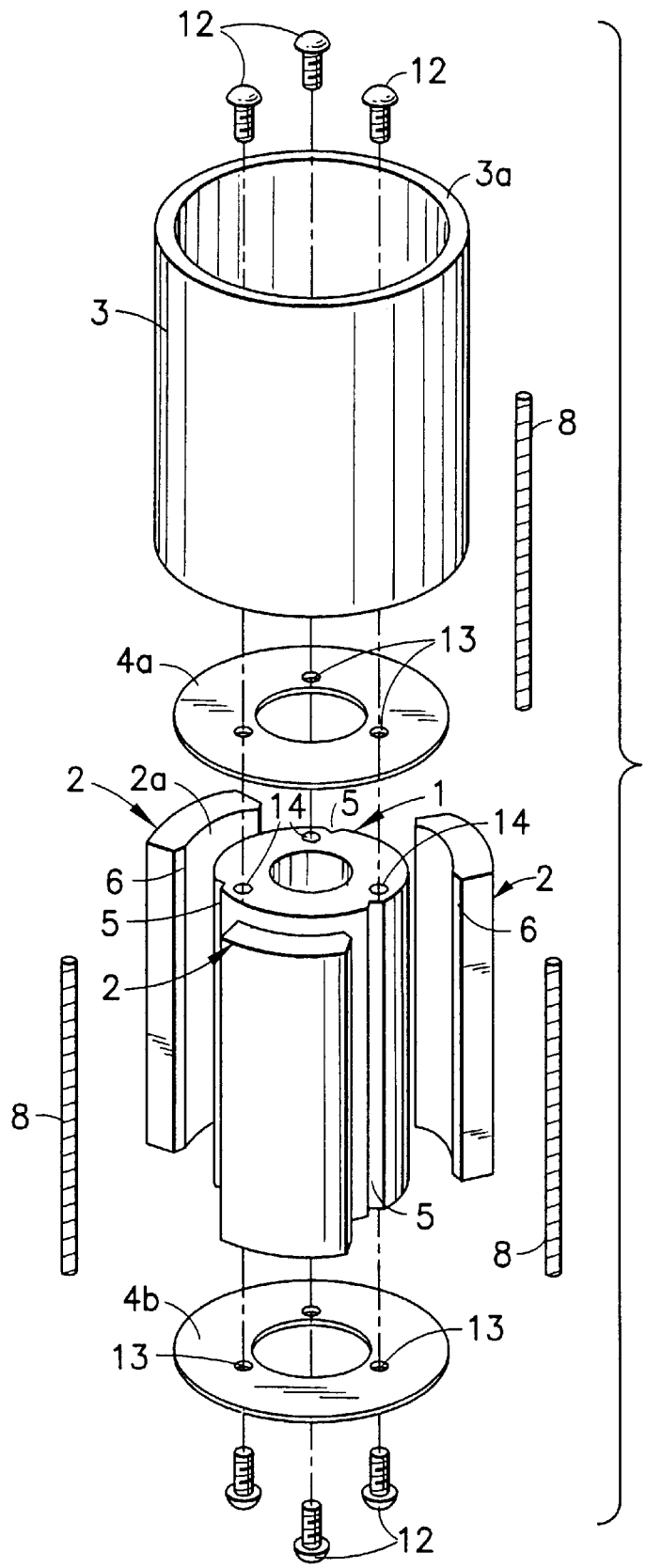
FIG. 2 is an exploded view of the rotor of FIG. 1.

Referring now to the drawings, and in particular to FIGS. 1–3, a permanent magnet rotor constructed in accordance with a preferred embodiment of the method and structure of the present invention is indicated generally at R. Briefly, rotor R includes a rotor core 1, a pair of annular end plates 4a and 4b, a plurality of arcuate shaped magnetic elements 2, and an outer magnet retaining shell 3 which, as more fully described hereafter, retains the magnetic elements securely against the core to prevent movement of the magnets relative to the core.

The core 1 is illustrated as comprising a solid metallic or sintered iron cylindrical core having a longitudinal cylindrical bore 1a extending axially through the core and defining a central axis 10. Alternatively, core 1 may be made as a laminated metallic core, which may be preferred in some applications.

In the illustrated preferred embodiment, three magnetic elements 2 are employed which comprise similarly shaped arcuate magnetizable elements. It will be understood that the term "magnetic elements" also includes magnetizable elements since, at the time of assembly with core 1 to form the rotor R, the magnetizable elements may or may not be in a magnetized condition. Each magnetic element 2 has an inner arcuate surface 2a having a radius of curvature substantially identical to the radius of curvature of the outer cylindrical surface of the core so as to fit closely against the circumferentially extending surface of the core when the rotor R is assembled.

In the illustrated preferred embodiment, the end plates 4a and 4b comprise identical flat rings or annular washers, preferably formed from aluminum or, alternatively, nonmagnetic stainless steel, having an outer radius preferably equal to the combined radius of the cylindrical surface of core 1 and the outer surface of the magnetic elements 2 when assembled onto the core. Each end plate has an inner radius larger than the radius of bore 1a in core 1, but smaller than the radius of the outer cylindrical surface of the core.

The rotor retaining shell 3 is preferably made from a nonmagnetic metal, such as stainless steel. The wall thickness of shell 3 is preferably on the order of 0.010", but advantageously may range from about 0.005", to about 0.020" in thickness.

The inner diameter of shell 3 is slightly greater than the diameter of the magnetic elements 2 when assembled against the core so as to provide a line-to-line or slip fit over the core and magnet assembly. Shell 3 has a longitudinal length equal to the longitudinal length of the core 1 plus the combined thickness of the two end plates 4a and 4b, and defines opposite continuous circular end edge surfaces 3a and 3b which lie in planes perpendicular to the longitudinal axis of the shell and flush with the outer flat surfaces of the end plates.

In accordance with the preferred embodiment of the present invention, spring-biasing means are provided to prevent relative rotational movement between magnetic elements 2 and rotor core member 1, and also to urge the magnetic elements into force-fitting contact with the inner surface of retaining shell 3.

To that end, as here preferably embodied and as best illustrated in FIGS. 2 and 2A, the outer circumferential surface of core 1 is provided with a plurality of longitudinally-extending generally "V"-shaped grooves 5 (equal in number to the number of magnetic elements) and the inner longitudinally-extending radial edges of each magnetic element 2 are chamfered, as shown at 6, such that, when magnets 2 are aligned about core 1 between grooves 5, the grooves and chamfers mate to form a generally diamond-shaped channel, as best seen in FIG. 2A. Also as here preferably embodied, an appropriately sized elongated spiral pin member 8 is inserted into each channel 7. Pin 8 is preferably formed by rolling or coiling a narrow, thin metallic band of nonmagnetic stainless steel, or other suitable material, into an elongated cylindrical configuration, so as to be spring-biased.

It will be seen from the foregoing that when spiral pins 8 are mounted in channels 7, relative rotational movement between magnets 2 and core 1 is prevented and, at the same time, magnets 2 are held tightly against the inner surface of retaining shell 3 by reason of the radially outwardly directed spring force, or wedging action, of pins 8. It will be understood that the spring-biasing action of pin members 8 is particularly advantageous for its ability to compensate for dimensional tolerance variations, resulting in reducing manufacturing costs without sacrificing durability or optimum operation.

Referring now more particularly to FIG. 4, an alternate embodiment of the present invention is illustrated. Here, the outer surface of rotor core 1 remains smooth and spiral spring pins 8 are inserted into each of the triangularly-shaped channels 9 formed by mating chamfered surfaces 6 of magnets 2 and the surface of core 1. As here embodied, the radially outwardly directed spring force, or wedging action of spiral pins 8 holds magnets 2 against both core 1 and retaining shell 3 by means of a tight friction fit.

Referring now more particularly to FIG. 5, an alternate embodiment of the spring-biasing member of the present invention is illustrated at reference numeral 11. Here, an elongated pin member is provided which is generally "C"-shaped in cross-section. Pin 11 is sized such that it must be compressed in order to insert it into either of the channel configurations 7 or 9 and thereafter exerts an outwardly directed spring force or wedging action against the channel walls similar to that of pins 8.

Advantageously, and as here preferably embodied, each of the end plates 4a, 4b is assembled to core 1 by means of a plurality, preferably three, of spiral, self-threading drive screws 12 which are driven or force-pressed through smoothwalled holes 13, 14 bored through the end plates and into core 1, respectively. Upon being driven or pressed into holes 13, 14, screws 12 create threads in the walls of the boreholes and thereby lock end plates 4a, 4b against the ends of core 1. Alternatively, of course, it will be understood that equally satisfactory results may be obtained by forming threads in holes 13, 14 and utilizing appropriate machines screws to mount the end plates in place.

In another embodiment where end plates 4a, 4b are formed from steel, no bore holes or screws are required to secure the end plates 4a, 4b to core 1. Instead, each of the end plates 4a, 4b is assembled to core 1 by laser welding.

It will be seen from the foregoing that the component parts shown in FIGS. 1–3 may be assembled in accordance with the method of the present invention to form a rotor as follows:

(a) One end plate 4a is attached to one end of the rotor core 1 using three of the spiral drive screws 12. The drive screws are suitably driven or pressed through boreholes 13, 14 in the end plate and core, respectively.

(b) The core/end plate subassembly is placed inside the rotor retaining shell 3 and positioned so the bottom end of the shell is flush with the outside face of end plate 4a. Shell 3 thereby acts as the assembly fixture for building the rotor assembly.

(c) Magnets 2 are inserted into the gap between the rotor retaining shell 3 and the rotor core 1. The magnets are arranged so the chamfers 6 located on their inner radii are in alignment with "v-grooves" 5 on the rotor core 1 to form longitudinally extending diamond-shaped channels 7.

(d) Appropriately sized spiral locking pins 8 or, alternatively, "C"-shaped locking pins 11, are pressed into channels 7 until their ends are flush with each of the ends of the rotor core 1, pins 8 providing a wedging action which is sufficient to securely hold the magnets and core together within shell 3 and also serving as stop members to prevent relative rotational slip between the magnets and the rotor core.

(e) The remaining end plate 4b is inserted into the rotor shell/core/magnet assembly and is affixed into position by inserting the remaining drive screws 12 into position through holes 13 in end plate 4b and into boreholes formed in the opposite end of the rotor core similar to those shown at 14.

Referring now more particularly to FIGS. 6–8 of the accompanying drawings, there is illustrated an alternate embodiment of the present invention, indicated generally at R'. As here embodied, the core 1, magnets 2', retaining shell 3 and end plates 4'a, 4'b are all held together with a suitable curable adhesive or cement bonding material to provide a hermetically-sealed encasement of the magnets. It will be seen that magnets 2' differ from magnets 2 only in that no chamfered edges are required and end plates 4'a, 4'b differ from end plates 4a, 4b only in that no boreholes are required.

Advantageously, in the preferred method of assembly of the present invention as here alternatively embodied, as in the method of assembly previously described, the retaining shell also serves as the assembly fixture for building the rotor assembly. Thus, the retaining shell is first coated with a suitable adhesive on its inner surface, whereupon the magnetic elements are positioned as desired within the shell with their outer arcuate surfaces adhered to the inner surface of the retaining shell; the inner arcuate surfaces of the magnetic elements are then adhesively coated, whereupon the rotor core is slip-fit into the cylindrical hole formed by the inner arcuate surfaces of the magnetic elements and thereafter adhered to the inner cylindrical magnet wall; thereafter, each of the end plates is, in turn, coated with a suitable adhesive and slip-fit within the retaining shell at each end thereof and adhered to opposite ends of the core whereupon the outside faces of the end plates advantageously are flush with the respective outer circumferential edges of the retaining shell; and, finally, the entire core/magnet/shell assembly is suitably clamped to hold the components in place until the adhesive is cured.

It will be understood that the aforesaid alternate embodiment of the rotor assembly of the present invention provides an effective seal of the ferric and ferromagnetic materials of the rotor at a relatively low manufacturing cost. For example, in this embodiment, like the embodiment of FIGS. 1–3, the retaining shell 3 is not deformed or press-fit about the magnet/core subassembly but, instead, each of the components of the core/magnet/shell assembly merely fit within one another in line-to-line relationship and are held in place by the respective layers of adhesive or cement bonding material. Also, the ends of shell 3 are not crimped or otherwise rolled over onto the end plates but, instead, remain flush with the outside faces of end plates 4'a, 4'b.

The aforesaid adhesive sealed rotor structure advantageously is useful in systems where the motor is not exposed to fluids which are capable of dissolving or leaching the adhesive or other bonding material.

While preferred embodiments of the rotor assembly and the method for making the same have been illustrated and described, it will be understood that changes and modifications may be made therein without departing from the invention in its broader aspects.

Thus, for example, grooves 5, channels 7, 9 and pins 8, 11 are merely representative of many configurations that could be employed and yet perform the described function with equally satisfactory results. Thus, grooves 5 and channels 7, 9 may have rectangular, rounded or U-shaped configurations, or combinations thereof.

Likewise, pins 8, 11 may be of any other appropriate shape or construction, so long as it performs the described spring-biasing and locking functions.

Similarly, any suitable number of arcuate magnetic elements 2, 2' may be provided and each element may have other configurations, such as the shape of a bread loaf, i.e. where both the inner and outer radial surfaces are arcuate shaped but with a somewhat greater distance therebetween than is shown in FIGS. 2 and 7. It further will be understood that the magnetic elements also advantageously may be formed as a single unitary annular structure and magnetized as desired at various radial positions about the magnetic ring element. If so constructed, suitably shaped grooves will then be formed on the inner annular surface of the magnetic ring so as to mate with grooves 5 on the core surface to thereby form channels such as shown at 7.

Still other materials and/or structures known by persons of ordinary skill in the art to function in substantially the same manner and obtain substantially the same result as the materials and/or structures disclosed herein, and hence understood by such persons to be interchangeable with the disclosed materials and/or structures, are within the scope of the appended claims.

Thus, the invention in its broader aspects is not limited to the specific embodiments herein shown and described, but departures may be made therefrom within the scope of the accompanying claims without departing from the principles of the invention, and without sacrificing its chief advantages.

What is claimed is:

1. A permanent magnet rotor comprising:
   a cylindrical rotor core member having a longitudinal axis, first and second flat ends and an outer surface having an outer radius of curvature;
   a plurality of arcuate magnetic elements, each of said magnetic elements having longitudinally extending opposed radial end surfaces and inner and outer radii of curvature, said inner radius of curvature being substantially equal to the outer radius of curvature of said core member such that said magnetic elements fit closely against said outer surface of said core member;
   a hollow cylindrical retaining shell having an inner circumference, and an inner radius of curvature substantially equal to the outer radius of curvature of said magnetic elements such that said retaining shell fits closely around said magnetic elements when said magnetic elements are positioned around said core member;
   means for preventing relative movement between said core member, said magnetic elements, and said retaining shell; and
   first and second annular end plates secured to said first and second flat ends of said core member, respectively, said plates having an outer circumference substantially equal to the inner circumference of said retaining shell,
   wherein said means for preventing relative movement comprises adhesive applied between said retaining shell and said magnetic elements, and between said magnetic elements and said core member.

2. The permanent magnet rotor of claim 1 wherein said first and second annular end plates are secured to said first and second flat ends of said core member using adhesive.

3. The permanent magnet rotor of claim 1 wherein said core member is a solid metallic core.

4. The permanent magnet rotor of claim 1 wherein said core member is a sintered iron core.

5. The permanent magnet rotor of claim 1 wherein said core member is a laminated metallic core.

6. A permanent magnet rotor comprising:
   a cylindrical rotor core member having a longitudinal axis, first and second flat ends, and an outer circumferentially extending surface;
   an annular cylindrical magnetic element having a longitudinal axis, and inner and outer circumferentially extending surfaces, said inner surface having a circumference substantially equal to the outer circumference of said core member;

a hollow cylindrical retaining shell having an inner circumference substantially equal to the outer circumference of said magnetic element;

means for preventing relative movement between said core member, said magnetic element, and said retaining shell; and first and second annular end plates secured to said first and second flat ends of said core member respectively, said plates having an outer circumference substantially equal to the inner circumference of said retaining shell, wherein said means for preventing relative movement comprises adhesive applied between said retaining shell and said magnetic element, and between said magnetic element and said core member.

7. The permanent magnet rotor of claim 6 wherein said first and second annular end plates are secured to said first and second flat ends of said core member using adhesive.

8. A method of assembling a permanent magnet rotor comprising the steps of:

providing a hollow cylindrical retaining shell having first and second ends, an inner circumference, an inner surface, and an inner radius of curvature;

coating said inner surface of said retaining shell with an adhesive;

providing a plurality of arcuate magnetic elements having inner and outer arcuate surfaces, and inner and outer radii of curvature, said outer radius of curvature being substantially equal to said inner radius of curvature of said retaining shell;

positioning said magnetic elements within said retaining shell with said outer arcuate surfaces adhered to said inner surface of said retaining shell such that said inner arcuate surfaces of said magnetic elements define a cylindrical space with a diameter;

coating said inner arcuate surfaces of said magnetic elements with an adhesive;

inserting a cylindrical rotor core member into said cylindrical space, said core member having first and second flat ends, an outer radius of curvature substantially equal to said inner radius of curvature of said magnetic elements, and a cross-sectional diameter substantially equal to said diameter of said cylindrical space;

securing a first annular end plate to said first flat end of said core member, said end plate having an outer circumference substantially equal to said inner circumference of said retaining shell; and securing a second annular end plate to said second flat end of said core member, said end plate having an outer circumference substantially equal to said inner circumference of said retaining shell.

9. A method of assembling a permanent magnet rotor comprising the steps of:

providing a cylindrical rotor core member having a longitudinal axis, first and second flat ends, and an outer circumferentially extending surface having an outer radius of curvature;

securing a first annular end plate to said first flat end of said core member, said end plate having an outer circumference;

providing a hollow cylindrical retaining shell having first and second ends, and an inner circumferentially extending surface having an inner radius of curvature, the inner circumference of said retaining shell being substantially equal to the outer circumference of said first end plate;

sliding said core member and said first end plate into said retaining shell until said first end plate is flush with said first end of said retaining shell, whereupon an annular space is created between said outer surface of said core member and said inner surface of said retaining shell;

providing a plurality of arcuate magnetic elements having inner and outer radii of curvature, and longitudinally extending opposed radial end surfaces, said inner radius of curvature of said magnetic elements being substantially equal to said outer radius of curvature of said core member, and said outer radius of curvature of said magnetic elements being substantially equal to said inner radius of curvature of said retaining shell, said plurality of magnetic elements being equal in number to said plurality of grooves in said outer surface of said core member and further being chamfered along the inner edges of said radial end surfaces;

inserting said magnetic elements into said annular space and aligning said chamfered edges of said magnetic elements with said grooves in said outer surface of said core member to create a plurality of enclosed longitudinally extending channels;

inserting spring biasing members into said longitudinally extending channels;

securing a second annular end plate to said second flat end of said core member, said second end plate having an outer circumference substantially equal to said inner circumference of said retaining shell.

10. The method of claim 9 wherein said first and second annular end plates are secured to said first and second flat ends of said core member respectively using screws.

11. The method of claim 10 wherein said screws are self-threading.

12. The method of claim 9 wherein said first and second annular end plates are laser welded to said first and second flat ends of said core member.

13. The method of claim 9 wherein said spring biasing members comprise elongated spiral pins.

14. The method of claim 13 wherein said elongated spiral pins are formed from steel bands.

15. The method of claim 9 wherein said spring biasing members comprise elongated pins having a generally c-shaped cross-section.

16. A permanent magnet rotor comprising:

a cylindrical rotor core member having a longitudinal axis, first and second flat ends and an outer surface having an outer radius of curvature;

a plurality of arcuate magnetic elements, each of said magnetic elements having longitudinally extending opposed radial end surfaces and inner and outer radii of curvature, said inner radius of curvature being substantially equal to the outer radius of curvature of said core member such that said magnetic elements fit closely against said outer surface of said core member;

a hollow cylindrical retaining shell having an inner circumference, and an inner radius of curvature substantially equal to the outer radius of curvature of said magnetic elements such that said retaining shell fits closely around said magnetic elements when said magnetic elements are positioned around said core member;

means for preventing relative movement between said core member, said magnetic elements, and said retaining shell; and first and second annular end plates secured to said first and second flat ends of said core member, respectively, said plates having an outer circumference substantially equal to the inner circumference of said retaining shell, wherein said rotor core member has a plurality of grooves in said outer surface, said grooves being spaced equidistantly about said outer surface and parallel to said longitudinal axis, said plurality of grooves being equal in number to said plurality of magnetic elements;

said magnetic elements being chamfered along inner edges of said longitudinally extending radial end surfaces such that a plurality of enclosed longitudinally extending channels are formed when said inner chamfered edges of said magnetic elements are aligned with said grooves in said outer surface of said rotor core member; and said means for preventing relative movement comprises spring biasing members mounted in said longitudinally extending channels.

17. The permanent magnet rotor of claim 16 wherein said spring biasing members comprise elongated spiral pins.

18. The permanent magnet rotor of claim 17 wherein said spiral pins are formed from steel bands.

19. The permanent magnet rotor of claim 16 wherein said spring biasing members comprise elongated pins having a generally c-shaped cross-section.

20. The permanent magnet rotor of claim 16 wherein said first and second annular end plates are secured to said first and second flat ends of said core member using screws.

21. The permanent magnet rotor of claim 20 wherein said screws are self-threading.

22. The permanent magnet rotor of claim 16 wherein said first and second annular end plates are laser welded to said first and second flat ends of said core member.

23. A permanent magnet rotor comprising:
  a cylindrical rotor core member having a longitudinal axis, first and second flat ends, and an outer circumferentially extending surface;
  an annular cylindrical magnetic element having a longitudinal axis, and inner and outer circumferentially extending surfaces, said inner surface having a circumference substantially equal to the outer circumference of said core member;
  a hollow cylindrical retaining shell having an inner circumference substantially equal to the outer circumference of said magnetic element;
  means for preventing relative movement between said core member, said magnetic element, and said retaining shell; and
  first and second annular end plates secured to said first and second flat ends of said core member respectively, said plates having an outer circumference substantially equal to the inner circumference of said retaining shell, wherein said rotor core member has a plurality of grooves in said outer surface, said grooves being spaced equidistantly about said outer surface and parallel to said longitudinal axis;

said magnetic element having a plurality of grooves in said inner surface, said grooves being spaced equidistantly about said inner surface of said magnetic element and parallel to said longitudinal axis, each of said magnetic elements grooves corresponding to one of said grooves on said outer surface of said core member to form enclosed longitudinally extending channels; and said means for preventing relative movement comprises spring biasing members mounted in said longitudinally extending channels.

24. The permanent magnet rotor of claim 23 wherein said spring biasing members comprise elongated spiral pins.

25. The permanent magnet rotor of claim 24 wherein said spiral pins are formed from steel bands.

26. The permanent magnet rotor of claim 23 wherein said spring biasing members comprise elongated pins having a generally c-shaped cross-section.

27. The permanent magnet rotor of claim 23 wherein said first and second annular end plates are secured to said first and second flat ends of said core member using screws.

28. The permanent magnet rotor of claim 27 wherein said screws are self-threading.

29. The permanent magnet rotor of claim 23 wherein said first and second annular end plates are laser welded to said first and second flat ends of said core member.

30. The permanent magnet rotor of claim 23 wherein said core member is a solid metallic core.

31. The permanent magnet rotor of claim 23 wherein said core member is a sintered iron core.

32. The permanent magnet rotor of claim 23 wherein said core member is a laminated metallic core.

* * * * *